United States Patent [19]

Bensinger et al.

[11] Patent Number: 5,352,164

[45] Date of Patent: Oct. 4, 1994

[54] SWITCHABLE DIFFERENTIAL DRIVE

[75] Inventors: Jörg Bensinger, Hennef; John Botterill, Saarbrücken; Karl-Heinz Hülsebusch, Köln, all of Fed. Rep. of Germany

[73] Assignee: GKN Automotive AG, Siegburg, Fed. Rep. of Germany

[21] Appl. No.: 65,637

[22] Filed: May 21, 1993

[30] Foreign Application Priority Data

May 26, 1992 [DE] Fed. Rep. of Germany ....... 4217313

[51] Int. Cl.⁵ ..................... B60K 17/08; B60K 17/16; B60K 23/04
[52] U.S. Cl. ..................................... 475/223; 475/243
[58] Field of Search ............... 475/223, 224, 243, 230, 475/150, 154

[56] References Cited

FOREIGN PATENT DOCUMENTS

| 0347165 | 12/1989 | European Pat. Off. |
| 433807 | 9/1926 | Fed. Rep. of Germany . |
| 3617074 | 11/1987 | Fed. Rep. of Germany . |
| 3909112 | 9/1990 | Fed. Rep. of Germany . |
| 3915959 | 11/1990 | Fed. Rep. of Germany . |
| 3920861 | 12/1990 | Fed. Rep. of Germany . |
| 2245320 | 1/1992 | United Kingdom . |
| 2245321 | 1/1992 | United Kingdom . |
| 2261040 | 5/1993 | United Kingdom . |

Primary Examiner—Edward K. Look
Assistant Examiner—Michael S. Lee
Attorney, Agent, or Firm—Harness, Dickey & Pierce

[57] ABSTRACT

A switchable differential drive, preferably for a vehicle driven by an electric motor, has a differential drive housing, a drivable differential carrier rotatably supported in the housing, two axle shaft gears supported therein, which are connected to output shafts extending out of the differential carrier and which are connected to one another via differential gears. A first output shaft is designed directly as an axle shaft and a second output shaft is coaxially supported in the first axle shaft. Two switching couplings are arranged coaxially relative to the latter axle shaft. To obtain a first gear stage, the first switching coupling is engaged, thereby non-rotatingly connecting the output shaft to the axle shaft, while the second switching coupling is open. To obtain a second gear stage with one wheel drive, the second switching coupling is engaged, thereby non-rotatingly connecting the output shaft to the differential drive housing while the other switching coupling is open.

7 Claims, 7 Drawing Sheets

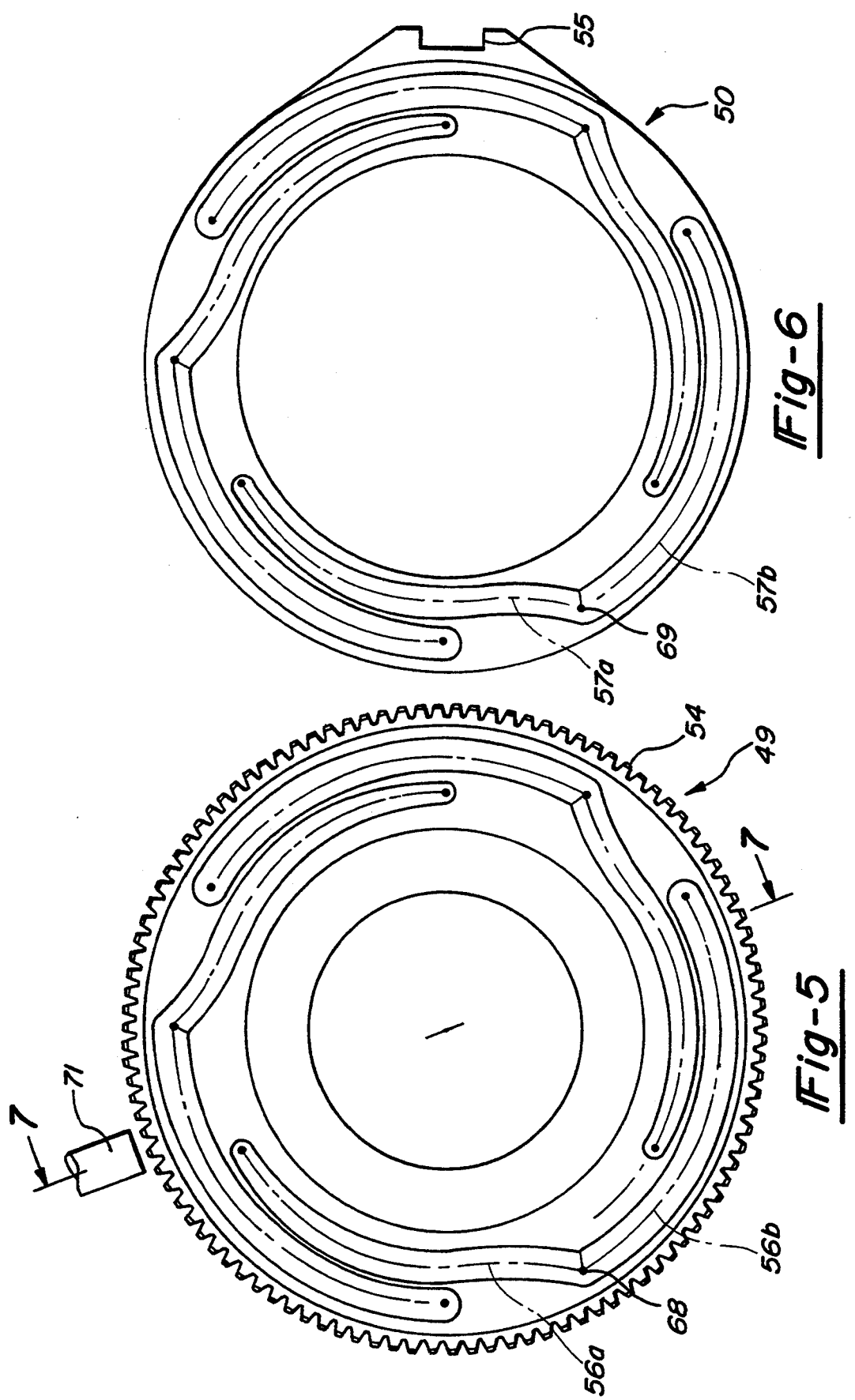

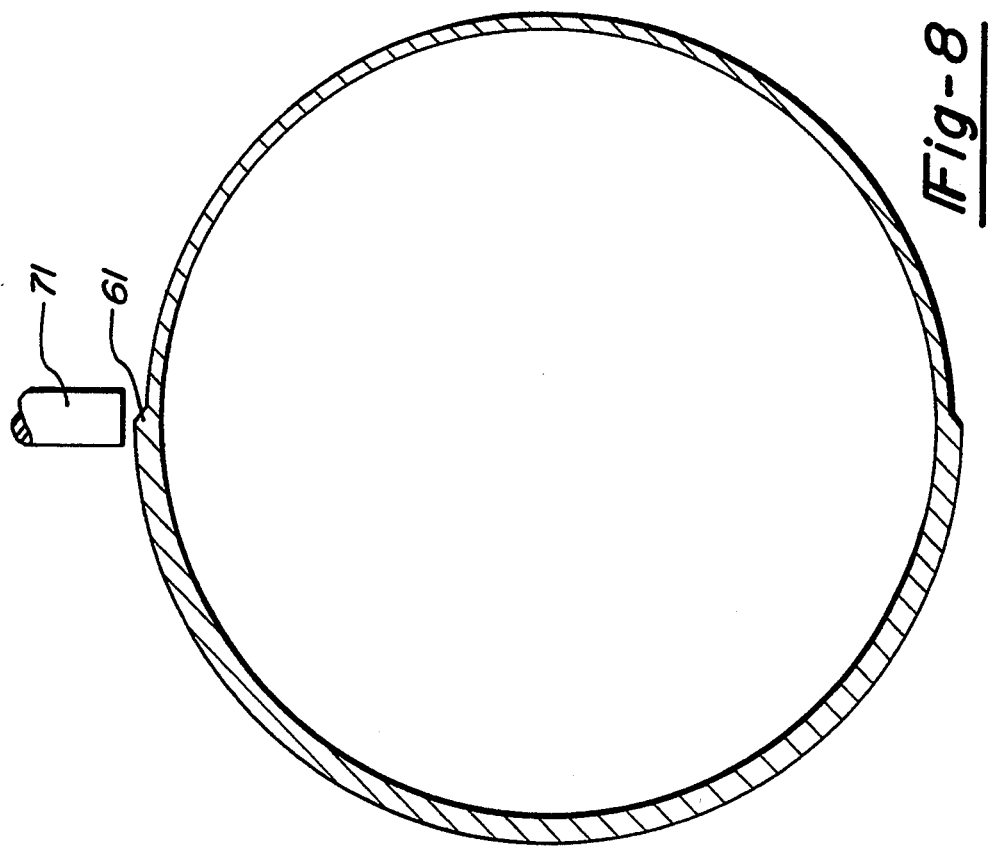
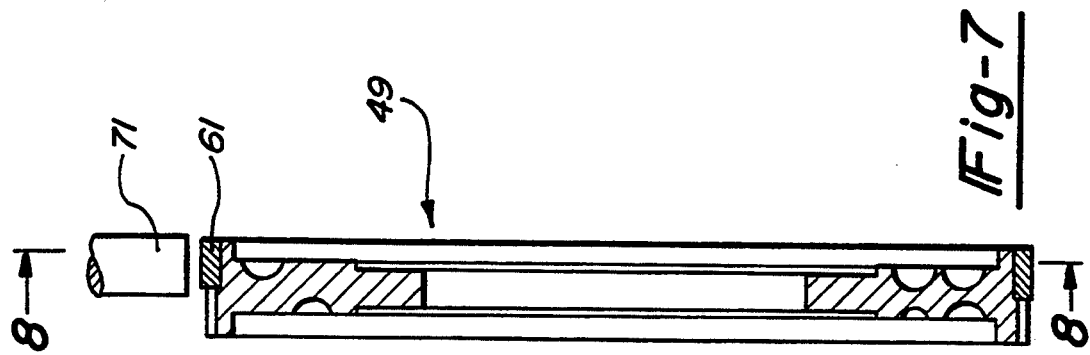

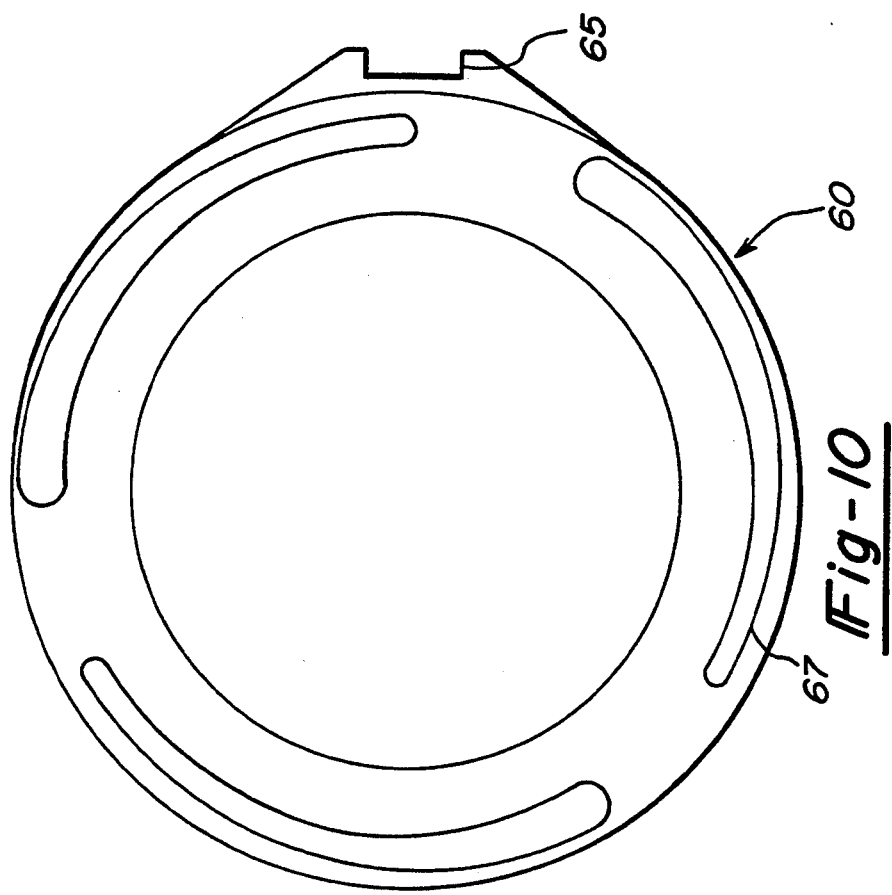
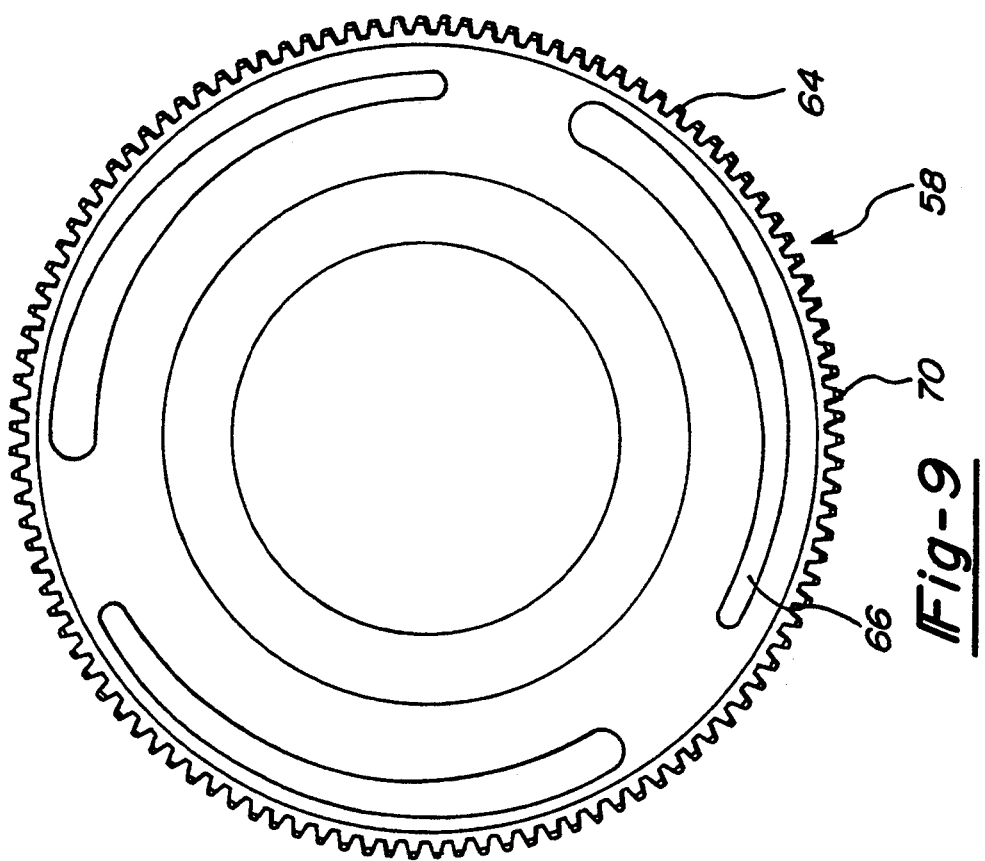

SWITCHABLE DIFFERENTIAL DRIVE

BACKGROUND OF THE INVENTION

The invention relates to a switchable differential drive, preferably for a motor vehicle drive.

EP 0 347 165 A2, published Dec. 20, 1989, describes a switchable differential drive which is used as a central differential of a four wheel drive vehicle. Also, this type of drive is used in the cases where different amounts of torque are distributed to the driveshafts in two different graduations. For these purposes, the differential is provided with three output shafts. One of two coaxially positioned output shafts is released and the other one is connected to an axle drive. A disadvantage of this design is a reversal in the direction of rotation.

The range of application of the present differential refers to motor vehicles driven by an electric motor, with only one axle being driven by the motor. In this application, the electric motor may be the only driving source of the vehicle. However, it may also be a vehicle with a hybrid drive in which case the electric motor is used in urban traffic and an internal combustion engine is used on the open road. In such a case, either the internal combustion engine drives the differential, with the electric motor disconnected, or it drives the second axle of the vehicle via a different differential of conventional design.

Considering the speeds of passenger cars, even if they are predominantly intended for urban traffic, the usable speed range of an electric motor rigidly connected to a differential is insufficient. Switchable control systems for the electric motor, which may improve the situation, are very expensive and not always technically satisfactory.

SUMMARY OF THE INVENTION

It is an objective of the present invention to provide a switchable differential drive which obtains two gear stages with different transmission ratios. A further objective provides a suitable coupling means.

In principle, the objective is achieved by a switchable differential drive for a vehicle driven by an electric motor. The drive has a differential drive housing which rotatably supports a drivable differential carrier. Two axle shaft gears are supported in the housing and are connected to output shafts extending out of the differential carrier. The two axle shaft gears are coupled to one another via differential gears. A first output shaft is designed as an axle shaft with a second output shaft coaxially supported in the first axle shaft. Further, two switching couplings are arranged coaxially relative to said axle shaft. To obtain a first gear stage with two wheel drive, the first switching coupling is engaged. This engagement non-rotatingly connects the output shaft to the axle shaft, while the second switching coupling is open. To obtain a second gear stage with one wheel drive, the second switching coupling is engaged. This engagement non-rotatingly connects the output shaft to the differential drive housing while the other switching coupling is open. It is thus possible to provide a differential drive which, in a simple way, represents a shiftable gearbox where the transmission ratio of the two gear stages is 1:2. For the lower gear stage which is intended for urban traffic, maneuvering and negotiating gradients, the differential effect is available. For driving on high-speed roads and country roads, only a one wheel drive is available, but with the driving conditions and the limited maximum speed of urban vehicles, this does not constitute any particular disadvantage.

A further objective is achieved by designing the two switching couplings as plate friction couplings. The two friction couplings may be suitably and advantageously actuated by pairing adjusting plates and pressure plates which are positioned coaxially relative to the shafts and couplings. The adjusting plate is rotatably drivable in the differential drive housing at an angle of up to 180°. The pressure plate is non-rotatingly movable in the differential housing along the shafts. The opposed faces of the plates are each provided with at least three ball grooves with variable depths, pairs of which each guide a bearing ball. Rotating the adjusting plate, via an electric adjusting drive, leads to an axial displacement of the pressure plate which, via suitable bearing means, acts on the package of plates of a plate coupling.

It is possible for each of the two switching couplings to be provided with its own unit with an adjusting plate and pressure plate which is driven by its own electric motor. The plates are preferably actuated such that the operations of opening the one and closing the other takes place while simultaneously slip occurs at the two couplings. Thus, interruption in traction force and revving up the electric motor during gear-changing is avoided.

In a further embodiment, an adjusting assembly is arranged between the two switching couplings. One single adjusting plate is positioned between two pressure plates which act on the respective couplings. Both sides of the adjusting plate are provided with ball grooves which guide corresponding bearing balls. There are circumferential regions of the ball grooves which are not permitted to change in depth, so that there is no further adjustment of one of the couplings, respectively. The position of the individual adjusting plates and thus the position of the couplings is sensed via contact-free sensors at the circumference of the adjusting disc. In order to set a neutral position the couplings are disengaged on both sides. During the switching process, the load on the driving motor is reduced.

The switching operations may be introduced manually or they may be controlled automatically as a function of the speed and load. Depending on the entire speed range, it is also possible to start in the second gear stage. If, in the process, slip occurs at the only driven wheel, the coupling may be partially disengaged from this gear in order to reduce the driving moment. If this does not succeed, it is necessary to change down to the first gear stage.

A neutral switching position "N", which is essential, disconnects the driving axle from the driving motor. Accordingly, it is necessary, with an adjusting device of the above-mentioned type with only one adjusting plate, to provide a position in which both switching couplings are disengaged. If separate adjusting devices with separately adjusting electric motors are provided, it is possible to obtain a neutral position and also, with different control means, to switch between the gears without interrupting the load flow.

The adjusting electric motors should preferably each be provided with a brake. The brake is actuated when the switching coupling is engaged so that the adjusted adjusting plate, when reaching its position, holds its position when the electric adjusting motor is powerless.

From the following detailed description taken in conjunction with the accompanying drawings and claims, other objects and advantages of the present invention will become apparent to those skilled in the art.

BRIEF DESCRIPTION OF THE DRAWINGS

Below, the invention will be explained with reference to drawings in which:

FIG. 5 is an axial view of an adjusting plate according to FIG. 3.

FIG. 6 is an axial view of a pressure plate according to FIG. 3.

FIG. 7 is a sectional view of the adjusting plate of FIG. 5 through line 7—7 thereof.

FIG. 8 is a sectional view of the adjusting plate of FIG. 7 through line 8—8 thereof.

FIG. 9 is an axial view of an adjusting plate according to FIG. 4.

FIG. 10 is an axial view of a pressure plate according to FIG. 4.

DETAILED DESCRIPTION OF THE PREFERRED EMBODIMENTS

Figure 1:
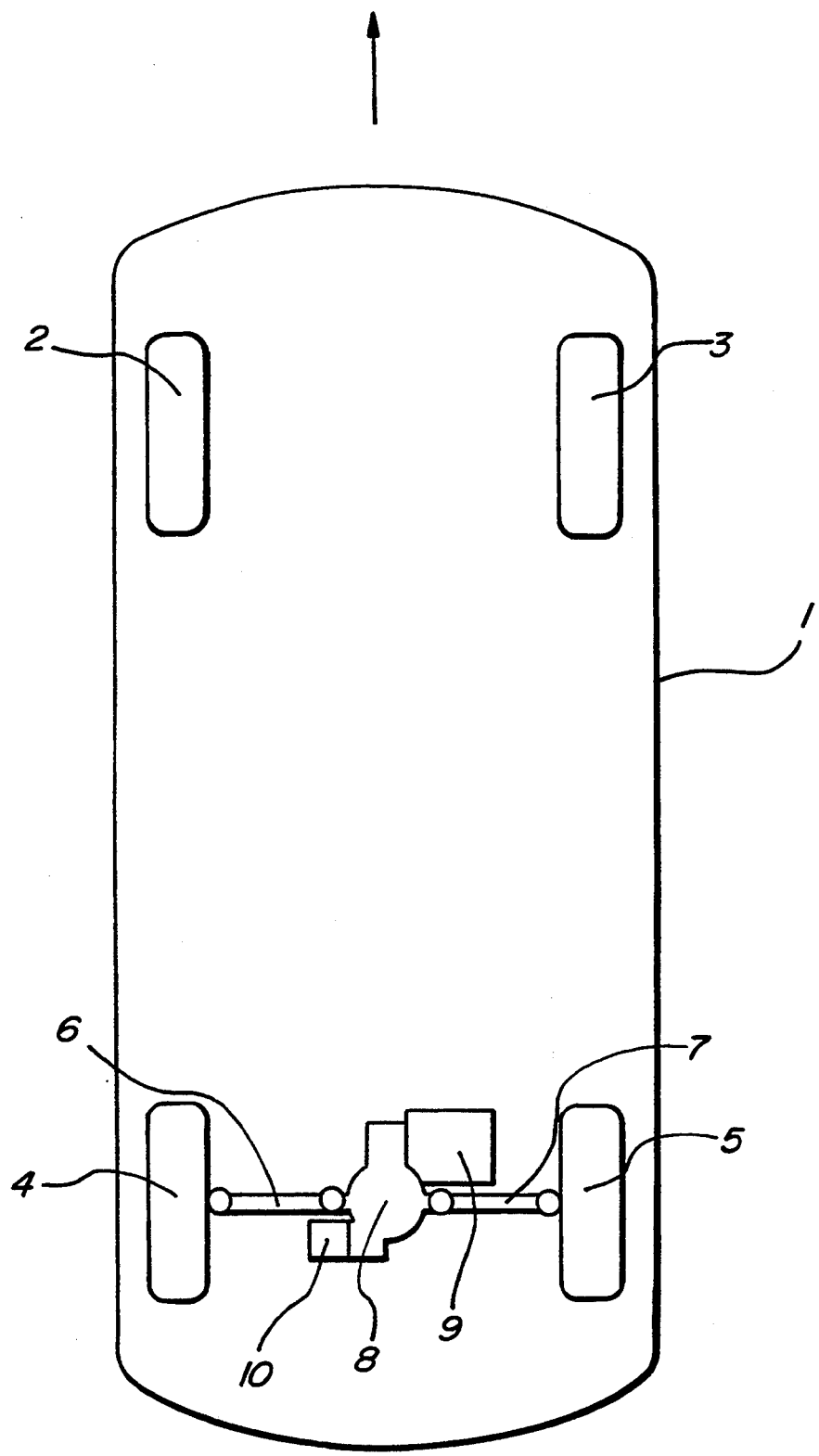
FIG. 1 is a schematic view illustrating a first embodiment of a drive in accordance with the invention.

FIG. 1 is a plan view of the outlines of a vehicle 1. The vehicle includes non-driven steerable front wheels 2, 3. The rear wheels 4, 5 via driveshafts 6, 7 are connected to a differential 8 in accordance with the invention. It is indicated that an electric driving motor 9 and an electric adjusting motor 10 are each flanged to the differential 8.

Figure 2:
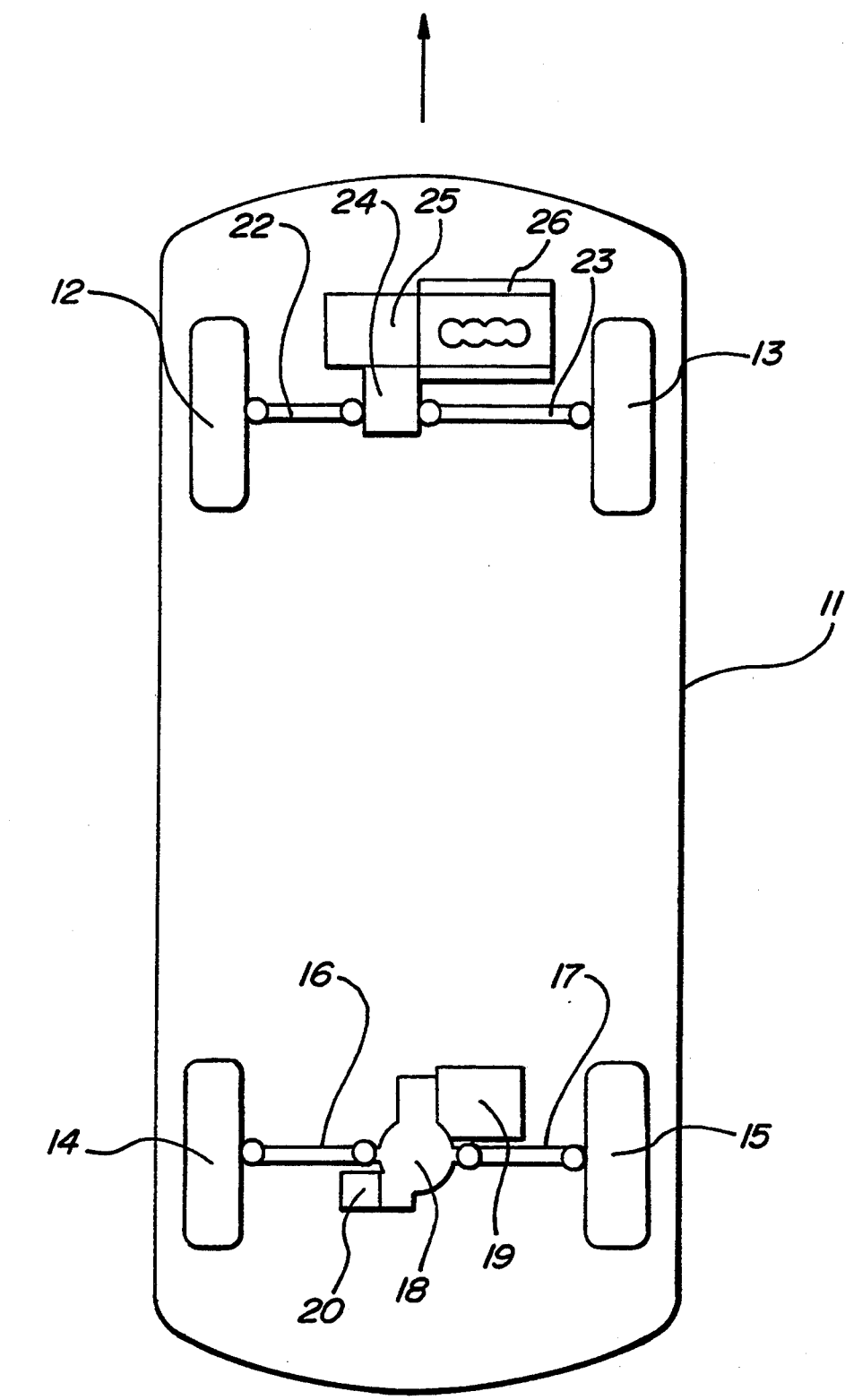
FIG. 2 is a schematic view illustrating a second embodiment of a drive in accordance with the invention.

FIG. 2 illustrates an outline of a vehicle 11. The steerable front wheels 12, 13 are connected to a differential 24 via driveshafts 22, 23. The differential 24, especially on country roads, is driven by an internal combustion engine 26 via a gearbox 25. Furthermore, the vehicle includes driven rear wheels 14, 15 which, via driveshafts 16, 17, are connected to a differential 18 in accordance with the invention. The differential 18 is driven by a flanged-on electric motor 19, especially in the case of urban driving. Furthermore, the flanged-on adjusting motor 20 is identifiable on the outside.

Figure 3:
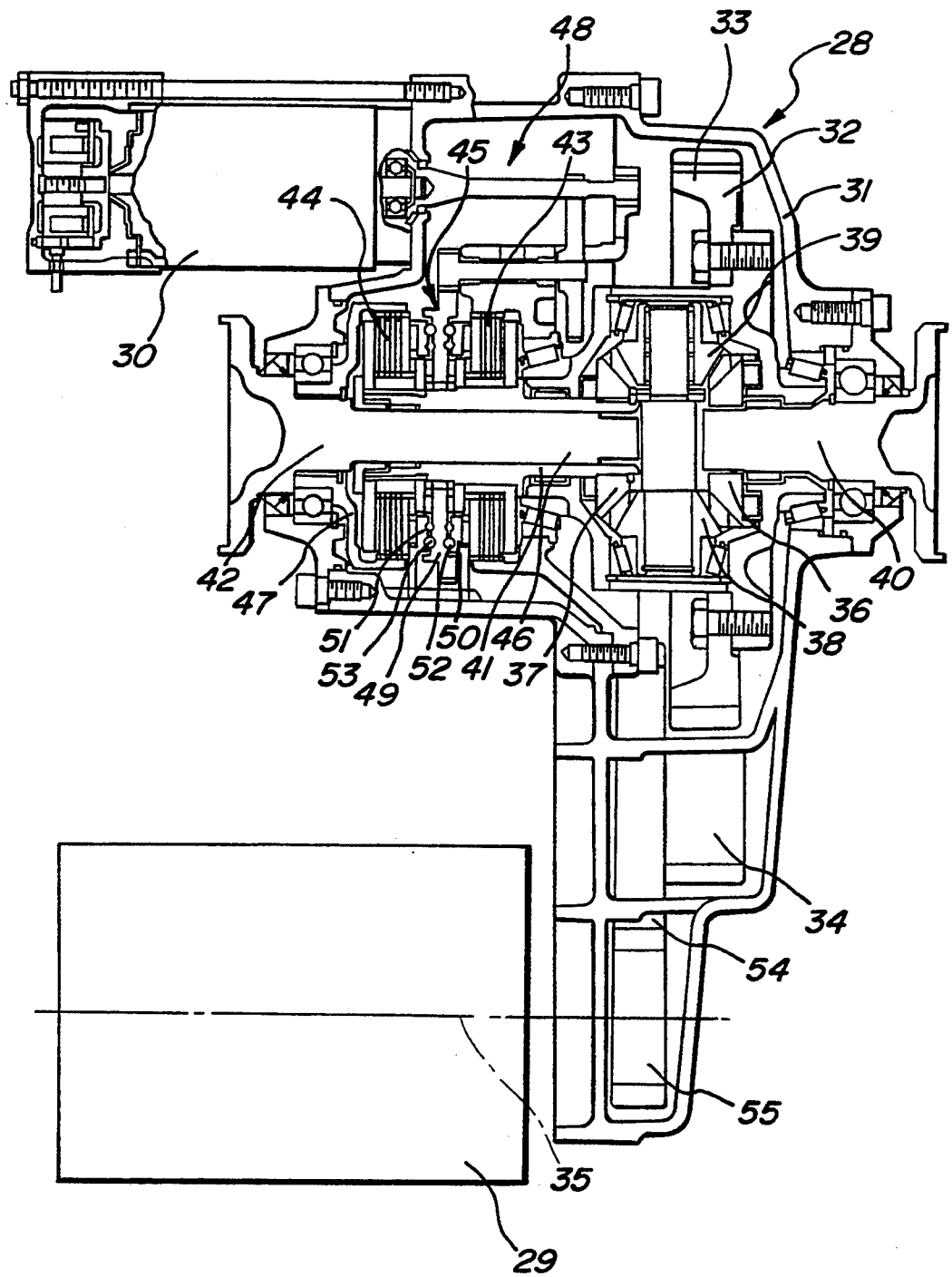
FIG. 3 is a cross sectional view of a drive with a differential in accordance with the invention through the axle shafts with couplings actuated by one single electric motor

FIG. 3 shows a differential 28 in accordance with the invention. An electric motor 29, which drives the differential 28, and a flanged-on adjusting motor 30 are coupled with the differential 28. The differential includes a housing 31 which, in a conventional way not explained in greater detail, rotatably supports a differential carrier 32. A spur gear 33, engaging a driving pinion 34, is flanged to the differential carrier 32. The driving pinion 34 is secured to an intermediate shaft illustrated only by its center line. A further driving pinion 54, engaging a third driving pinion 55, is also secured to the intermediate shaft. The third driving pinion 55 is secured to the driveshaft 35 of the driving electric motor 29, which again is illustrated only by its center line.

The differential is designed as a bevel gear differential. A first output gear 36 and a second output gear 37 are connected to one another via differential gears 38, 39. The output gear 36 is secured to an output shaft 40. The output shaft 40 extends out of the differential carrier and at the same time constitutes an axle shaft provided with a flange.

The output gear 37 is positioned on an output shaft 41, designed as a hollow shaft. An axle shaft 42 provided with a flange is coaxially supported on said output shaft 41. Two switchable plate friction couplings 43, 44, with an adjusting device 45 arranged coaxially therebetween, are arranged coaxially relative to the shafts 41, 42. The outer plates of the first switching coupling 43 are non-rotatingly positioned on a carrier 46 in the differential drive housing 31. The inner plates of the switching coupling 43 are non-rotatingly positioned on the output shaft 41. The outer plates of the switching coupling 44 are non-rotatingly positioned in an annular housing 47 which is non-rotatingly connected to the axle shaft 42. The inner plates of the second switching coupling 44 are non-rotatingly positioned on the hollow output shaft 41.

The actuating assembly of the adjusting device 45 includes an adjusting plate 49 which is rotatably driven by the adjusting motor 30 via a reduction gear 48. Pressure plates 50, 51 are positioned to adjoin the adjusting plate 49. All three plates are supported so as to be rotatable relative to the shaft 41 rotating therein. The adjusting plate 49 is rotatable in the drive housing 31 via the drive 30. However, the pressure plates 50, 51 are non-rotatable, but axially movably held in the drive housing 31. Between the pressure plate and the adjusting plates are bearing balls 52, 53 running in grooves in the plates 50, 51.

When the first switching coupling 43 is disengaged and the second switching coupling 44 engaged, the output shaft 41 and axle shaft 42 are non-rotatingly connected to one another. The differential drive has the usual function of distributing torque between the axle shafts 40, 42.

When the first switching coupling 43 is engaged and the second switching coupling 44 disengaged, the axle shaft 42 rotates freely so that it does not transmit any moments. The output shaft 41 is held in the housing 31 so that, in accordance with the known laws, the axle shaft 40 is driven at twice the speed of the differential carrier relative to the drive housing.

Figure 4:
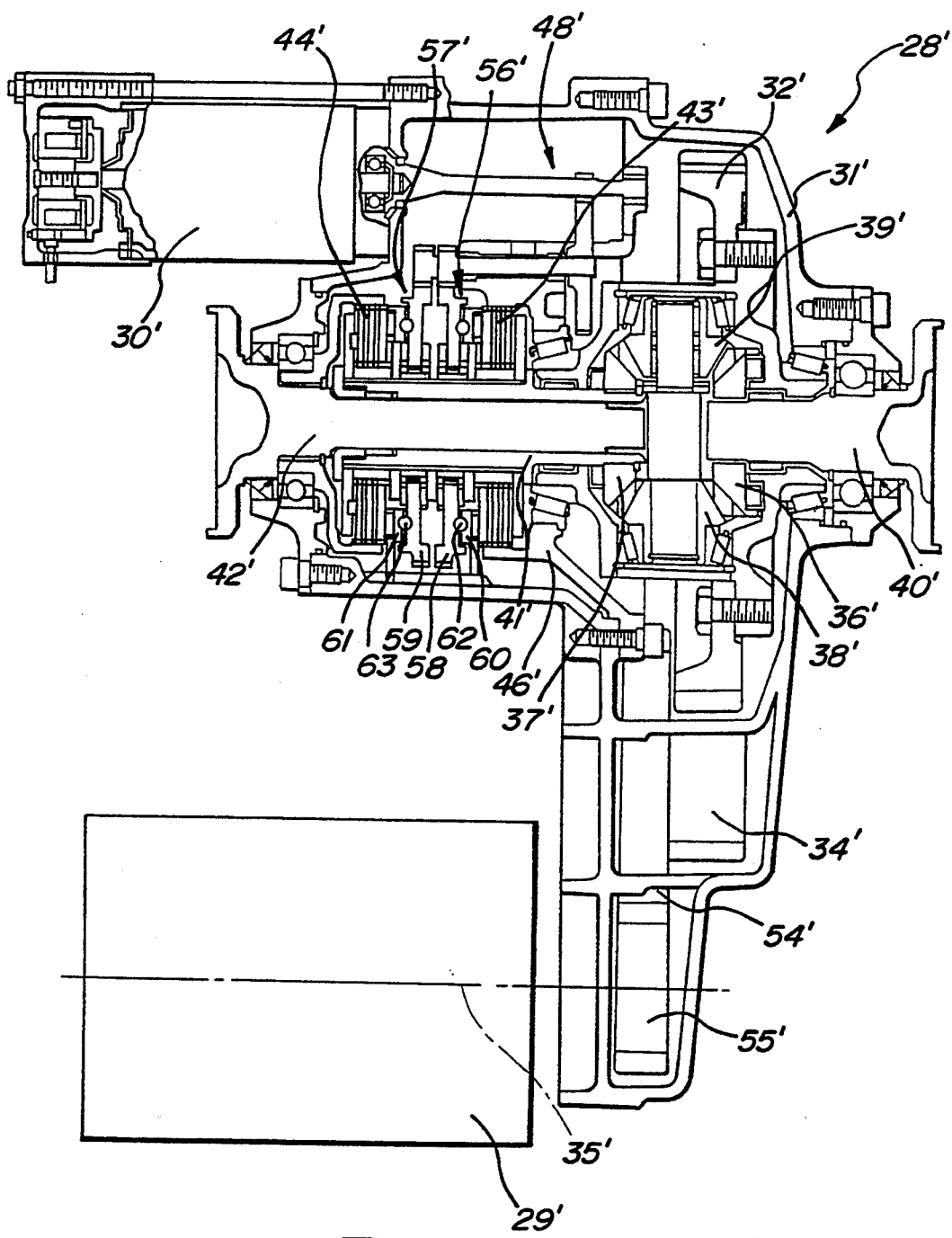
FIG. 4 is a cross sectional view of a drive having a differential in accordance with the invention through the axle shafts with couplings actuated by separate electric motors.

FIG. 4 shows a differential 28' in accordance with the invention including an electric motor 29' driving the differential and a flanged-on adjusting motor 30'. Details substantially correspond to those shown in FIG. 3, so that below reference will only be made to differences between the two figures and the numerals remaining the same have been primed.

Two switchable plate friction couplings 43', 44' are arranged coaxially relative to the shafts. Between the plates, in this case, is positioned two adjusting devices 56, 57 which are independent of one another. The actuating assembly of the adjusting device 56 includes the adjusting motor 30 and a reduction gear 48'. The adjusting device 56 includes a rotatably driven adjusting plate 58 and an adjoining pressure plate 60. Of the actuating assembly of the adjusting device 57 positioned in a different plane, only a pinion is identifiable. The adjusting device 57 includes a rotatably driven adjusting plate 59 and an adjoining pressure plate 61. All four plates 58–61 are supported so as to be rotatable relative to the shaft 41'. The adjusting plates 58, 59 are rotatable in the drive housing 31' via the drives. However, the pressure plates 60, 61 are non-rotatable, but axially movably held in the drive housing 31'. Between the pressure plates and the adjusting plates, bearing balls 62, 63 are positioned between the pressure plates running in the grooves on the plates.

FIGS. 5 and 6 which below will be described jointly, show the adjusting plate 49 and pressure plate 50 according to FIG. 3. The adjusting plate 49 has outer teeth 54 which are driven by the adjusting motor 30. The pressure plate 50 has a guiding groove 55 to guidingly engage a part fixed to the housing. Both plates each have three circumferentially distributed ball tracks 56, 57. The tracks 56, 57 include an adjusting region 56a, 57a where the track depth decreases towards the track ends and a neutral region 56b, 57b with a greater track depth which does not decrease. If the plates are positioned one above the other, the tracks extend in opposite directions.

In each case, two tracks located one above the other receive one bearing ball. If the balls are located in the adjusting regions 57a, the pressure plate 50 is pushed away from the adjusting plate 49 by the balls on their way to the end of the ball track. In the process, the coupling is engaged. If the movement takes place in the opposite direction, the coupling is disengaged until the neutral position 68, 69 is reached. In the case of an adjusting plate according to FIG. 3, the further rotational travel in the course of which the balls are located in the neutral regions 56b, 57b may be utilized for an adjusting movement on the opposite side of the adjusting plate and the respective associated pressure plate. In FIG. 5, a sensor 71 is identifiable at the outer circumference.

FIGS. 7 and 8 which below will be described jointly show the sensor 71 cooperating with a transmitter ring 61 provided at the adjusting plate 49. The ring 61 generates a jump function to indicate the position in which the neutral positions 68, 69 of the plates coincide.

FIGS. 9 and 10, which below will be described jointly, show adjusting plate 58 and pressure plate 60. The adjusting plate 58 includes outer teeth 70 which are driven by the adjusting motor 30. The pressure plate 60 includes a guiding groove 65 to guidingly engage a part fixed to the housing.

Both plates each have three circumferentially distributed ball tracks 66, 67 whose track depth changes along the entire circumferential length. If the plates are placed one above the other, the tracks extend in opposite directions. In each case, two tracks, located one above the other, receive one bearing ball. By rotating the adjusting disc 58, the pressure plate 60 is axially pushed away by the balls on there way to the flat end. In the process, the coupling is engaged. If the movement takes place in the opposite direction, the neutral position is reached when the lowest position at the opposite track end is reached, thus the coupling is disengaged. The correspondingly designed adjusting plate and pressure plate of the second adjusting assembly may be adjusted synchronously or, subsequently, in the opposite direction. In the first case, switching takes place without the traction force being interrupted. In the second case, a neutral position is reached first, and both couplings are disengaged.

While the above detailed description describes the preferred embodiment of the present invention, the invention is susceptible to modification, variation, and alteration without deviating from the scope and fair meaning of the claims.

We claim:

1. A switchable differential drive preferably for a vehicle driven by an electric motor, comprising:
    a differential drive housing;
    a drivable differential carrier rotatably supported in said housing;
    two axle shaft gears supported within said housing, said axle shaft gears being connected to output shafts extending out of the differential carrier and which are coupled to one another via differential gears;
    a first output shaft being an axle shaft and a second output shaft being coaxially supported in the axle shaft;
    two switching couplings being arranged coaxially relative to said axle shaft; and
    means for actuating said switching couplings wherein, to obtain a first gear stage, said first switching coupling being engaged, thereby non-rotatingly connecting the output shaft to the axle shaft, while the second switching coupling is open, and obtaining a second gear stage, when said second switching coupling being engaged, thereby non-rotatingly connecting said output shaft to the differential drive housing while the other switching coupling is open.

2. A differential drive according to claim 1, wherein said differential drive is a bevel gear differential.

3. A differential drive according to claim 1, wherein said differential drive is a spur gear differential.

4. A differential drive according to claim 1, wherein said actuating means of said switching couplings respectively include a first rotatable adjusting ring axially fixed in the drive housing, a second non-rotating pressure ring axially movable in the drive housing, said two rings being arranged so as to be rotatable relative to one another by a limited angular amount; and opposed end faces of said adjusting ring and pressure ring are provided with circumferentially extending grooves forming opposing pairs for at least three rolling members, the depth of said grooves being variable in opposite directions; and said pressure ring acting on the respective switching coupling via an axial pressure bearing and said adjusting ring being rotatable via a rotary means, with said pressure ring being displaceable relative to the supported adjusting ring via the rolling members and pairs of grooves.

5. A differential drive according to claim 4, wherein said actuating means are located between said switching couplings and a joint adjusting ring is provided for two pressure rings.

6. A differential drive according to claim 5, wherein an electric adjusting motor is associated with said rotary means of the joint adjusting ring, and the rotary means including a braking mechanism which is released only when the electric adjusting motor is actuated.

7. A differential drive according to claim 4, wherein said rotary means of the adjusting ring of each of the two switching couplings including an electric adjusting motor, respectively, and a braking mechanism which is released only when the respective electric adjusting motor is actuated.

* * * * *